United States Patent [19]
Roberts

[11] Patent Number: 6,009,901
[45] Date of Patent: Jan. 4, 2000

[54] DRY DISCONNECT COUPLING

[75] Inventor: Robert D. Roberts, Cary, N.C.

[73] Assignee: EMCO Wheaton DTM, Inc., Morrisville, N.C.

[21] Appl. No.: 09/015,364

[22] Filed: Jan. 29, 1998

Related U.S. Application Data

[60] Provisional application No. 60/071,742, Jan. 16, 1998.

[51] Int. Cl.[7] .................................................... F16L 37/28
[52] U.S. Cl. ............................... 137/614.06; 137/614.01; 137/614.05
[58] Field of Search .............................. 137/614, 614.05, 137/614.06, 614.01

[56] References Cited

U.S. PATENT DOCUMENTS

| | | | |
|---|---|---|---|
| 3,407,847 | 10/1968 | Snyder | 137/614.06 |
| 4,135,551 | 1/1979 | Knight et al. | 137/614.06 |
| 4,618,171 | 10/1986 | Fahl | 285/93 |
| 4,687,016 | 8/1987 | Takahashi | 137/240 |
| 4,948,094 | 8/1990 | Fahl | 251/149.6 |
| 4,971,107 | 11/1990 | Yonezawa | 137/614.03 |
| 4,989,630 | 2/1991 | Yonezawa | 137/240 |
| 5,078,170 | 1/1992 | Henry | 137/614.06 |
| 5,273,071 | 12/1993 | Oberrecht | 137/614.06 |
| 5,407,175 | 4/1995 | Roberts | 251/148 |
| 5,628,344 | 5/1997 | Roberts | 137/614.06 |

*Primary Examiner*—A. Michael Chambers
*Attorney, Agent, or Firm*—Christopher C. Dremann, PC; Christopher C. Dremann

[57] ABSTRACT

A dry disconnect coupling is provided for connecting one fluid conduit to another to form a continuous, essentially fluid-tight path. The coupling includes an adapter and a coupler which, when coupled together, define a flow passageway therethrough. The adapter includes a hollow, generally cylindrical adapter body, adapter valve means and improved means for releasing the adapter from the coupler. The coupler includes a hollow, generally cylindrical coupler body, coupler valve means, improved connecting means for providing a rigid, fluid-tight connection between the adapter and the coupler, an annular connecting sleeve, sleeve override means, an annular nosepiece, nosepiece override means, improved sealing means for sealing the coupling and a cam assembly for cooperating with the sleeve override means, the nosepiece override means and the coupler valve means. The connecting means prevents fluid in the flow path from leaking during a fluid transfer operation even if a side load is applied to the coupling or if the mechanical components of the coupling are worn. The sealing means prevents fluid residue from accumulating on the periphery and the faces of the poppet valves of the adapter and the coupler as the flow path is established so that the loss at disconnect is minimized. The releasing means permits the adapter and the coupler to be easily and readily disconnected after a fluid transfer operation.

21 Claims, 6 Drawing Sheets

DRY DISCONNECT COUPLING

CROSS REFERENCE TO RELATED APPLICATION

This application claims the benefit of U.S. Provisional Application Ser. No. 60/071,742, filed Jan. 16, 1998.

FIELD OF THE INVENTION

The present invention relates to a fluid coupling, and more particularly to a dry disconnect coupling for connecting one fluid conduit to another to form a continuous, essentially fluid-tight flow path.

BACKGROUND OF THE INVENTION

Dry disconnect couplings are used in various applications to connect one fluid conduit to another to form a continuous flow path. For example, dry disconnect couplings are used to form a continuous flow path between a storage tank and a tanker truck to transfer caustic chemicals or petroleum products at a storage tank farm. Typically, the dry disconnect coupling includes an adapter and a coupler. One end of the adapter is attached to the fill pipe of the tanker truck, and one end of the coupler is attached to a transfer hose from the storage tank. The free end of the adapter is then connected to the free end of the coupler to complete the coupling. When coupled together, the adapter and the coupler define a flow passageway therethrough that is sealed by a pair of internal poppet valves having opposed faces. The continuous flow path is established by displacing the poppet valve of the coupler in the direction of the poppet valve of the adapter to open the coupling.

When the fluid, for example a caustic chemical solution, is transferred from the storage tank to the tanker truck, residual fluid may collect around the periphery and on the face of the poppet valve of the adapter and the poppet valve of the coupler. This residual fluid may inadvertently be spilled onto the ground when the adapter and the coupler are disconnected, and accordingly, is referred to hereinafter as "the loss at disconnect". Although the loss at disconnect that may be spilled after each fluid transfer operation is generally less than an ounce, repeated fluid transfer operations can result in significant contamination of the ground in the vicinity of the coupling. In fluid transfer operations involving caustic chemicals, any amount of ground contamination is particularly unacceptable because the chemicals may be toxic to the environment and to individuals handling the coupling. It is therefore desirable to minimize the loss at disconnect to prevent caustic chemicals and other environmentally hazardous fluids from contaminating the ground in the vicinity of the coupling.

Contamination of the ground in the vicinity of the coupling may also occur when a "side load" is applied to the coupling. The term "side load" as used herein refers to a force which is applied in any direction other than along the longitudinal axis of the coupling, and which therefore produces a bending moment about the longitudinal axis. For example, the influence of gravity on the center of mass of the coupling produces a bending force about the longitudinal axis that may be significant enough to cause the coupling to leak during a fluid transfer operation. Similarly, a handling force applied to the coupling, or at a point on the transfer hose adjacent to the coupling, in a direction other than along the longitudinal axis may cause the coupling to leak during a fluid transfer operation. A side load may also separate the face of the poppet valve of the adapter from the face of the poppet valve of the coupler, thus permitting additional fluid residue to accumulate on the faces of the poppet valves which contributes to the loss at disconnect.

Additional contamination of the ground in the vicinity of the coupling may also occur as the mechanical components of the means for connecting the adapter to the coupler become worn. Initially, the connection between the adapter and coupler is rigid and fluid-tight. However, after the adapter and the coupler have been connected and disconnected numerous times, the connection may become "loose" and cause the coupling to leak during a fluid transfer operation. In some coupling designs, the connection becomes loose after the adapter and the coupler have been connected and disconnected only a few times. Accordingly, external means for collecting the fluid as it leaks from the coupling must be utilized to prevent the fluid from contaminating the ground in the vicinity of the coupling.

A conventional dry disconnect coupling is disclosed in U.S. Pat. No. 5,273,071 issued Dec. 23, 1993, to Oberrecht. The Oberrecht coupling includes an adapter and a coupler that, when coupled together, define a flow passageway therethrough. The adapter and the coupler each include an internal poppet valve. When closed, the poppet valves seal the coupling. When opened, the poppet valves permit fluid to flow through the flow passageway defined by the adapter and the coupler to establish a continuous flow path. The Oberrecht coupling is further provided with an O-ring mounted in a groove formed in the face of the poppet valve of the coupler. When the poppet valve of the coupler is displaced in the direction of the adapter, the O-ring forms a seal with the face of the poppet valve of the adapter to prevent the faces of the poppet valves from being wetted during a fluid transfer operation. Thus, the O-ring minimizes the amount of fluid residue that accumulates on the poppet valves and contributes to the loss at disconnect.

Fluid residue may still, however, accumulate around the periphery of the faces of the poppet valves of the Oberrecht coupling. This fluid residue is not returned to the flow path or to an external reservoir, but instead migrates around the periphery of the poppet valves under the influence of gravity and collects inside the coupling opposite the ground. When the adapter and the coupler are subsequently disconnected, the fluid residue spills onto and contaminates the ground in the vicinity of the coupling. Further, the O-ring of the Oberrecht coupling may become worn. If not replaced, the O-ring may leak and permit additional fluid residue to collect on the faces of the poppet valves of the coupler and the adapter. This additional fluid residue may likewise contribute to the loss at disconnect.

Another example of a dry disconnect coupling is disclosed in U.S. Pat. No. 5,628,344 issued May 13, 1997, to Roberts and assigned to the assignee of the present invention. The coupling includes an adapter and a coupler that, when coupled together, define a flow passageway therethrough. The Roberts coupling further includes means for returning fluid residue that accumulates around the periphery and on the faces of the poppet valves directly to the flow passageway or to an internal holding chamber. The returning means includes a reservoir for collecting the fluid residue that drains (under the influence of gravity) from the poppet valves of the adapter and the coupler after a fluid transfer operation. In one embodiment, the returning means further includes a venturi vacuum for suctioning the fluid residue out of the reservoir and back into the flow passageway during a subsequent fluid transfer operation. In another embodiment, the returning means further includes aspirating and pumping means for first suctioning the fluid residue out of the reservoir into a holding chamber, and then pumping the fluid residue out of the holding chamber and back into the flow passageway during a subsequent fluid transfer operation.

The dry disconnect coupling disclosed in U.S. Pat. No. 5,628,344 is essentially fluid-tight under normal operating conditions, and therefore minimizes the loss at disconnect. However, when the poppet valves of the coupler and the adapter are opened and closed before and after a fluid transfer operation, respectively, there remains an opportunity for fluid residue to accumulate around the periphery and on the faces of the poppet valves. There is likewise an opportunity for fluid residue to accumulate on the faces of the poppet valves when a side load is applied to the coupling or to the transfer hose adjacent the coupling. This fluid residue may then spill onto the ground when the adapter and the coupler are disconnected if the fluid residue has not completely drained from the faces of the poppet valves into the reservoir.

As disclosed in U.S. Pat. No. 5,407,175 issued Apr. 18, 1995, to Roberts, the adapter of the coupling preferably includes a rotatable annular flange for attaching the adapter to the coupler. The flange is rotatable to facilitate repositioning of the flange relative to the circumferentially spaced latching lugs of the coupler, and to thereby distribute wear evenly on the flange. Thus, a rigid, fluid-tight connection is maintained while the service life of the adapter is extended. However, the flange must be inspected at regular intervals and rotated, if necessary, to prevent the connection from becoming loose over time. Further, if not replaced, the flange may eventually become sufficiently worn (despite being rotated at regular intervals) to cause the coupling to leak during a fluid transfer operation.

Accordingly, it is apparent that there is a need for a fluid coupling for connecting one fluid conduit to another to form a continuous, essentially fluid-tight flow path. In particular, there is a need for a fluid coupling that does not leak when a force is applied in any direction other than along the longitudinal axis of the coupling, or when the mechanical components of the coupling become worn after connecting and disconnecting the adapter and the coupler more than a few times. Likewise, there is a particular need for a fluid coupling that prevents fluid residue from accumulating on the faces of the poppet valves of the adapter and the coupler during a fluid transfer operation.

Therefore, it is a principal object of the present invention to provide a fluid coupling for connecting one fluid conduit to another to form a continuous, essentially fluid-tight flow path.

It is another, more particular, object of the invention to provide a dry disconnect coupling which includes improved connecting means for providing a rigid, essentially fluid-tight connection between the adapter and the coupler to prevent a side load applied to the coupling from causing fluid to leak during a fluid transfer operation.

It is another, more particular, object of the invention to provide a dry disconnect coupling which includes improved connecting means for providing a rigid, essentially fluid-tight connection between the adapter and the coupler to prevent wear of the mechanical components of the coupling from causing fluid to leak during a fluid transfer operation.

It is another, more particular, object of the invention to provide a dry disconnect coupling which includes improved sealing means for preventing fluid residue from accumulating on the faces of the poppet valves of the adapter and the coupler during a fluid transfer operation.

It is another, more particular, object of the invention to provide a dry disconnect coupling which includes improved releasing means for releasing the connecting means of the coupling to disconnect the adapter and the coupler.

It is yet another, more particular, object of the invention to provide a coupler for a dry disconnect coupling which includes improved connecting means for providing a fluid-tight connection between the adapter and the coupler so as to essentially eliminate the possibility that fluid residue may leak during a fluid transfer operation.

It is yet another, more particular, object of the invention to provide a coupler for a dry disconnect coupling which includes improved sealing means for preventing fluid residue from accumulating on the faces of the poppet valves so as to essentially eliminate the possibility that fluid residue may spill when the adapter and the coupler are disconnected and contaminate the ground in the vicinity of the coupling.

SUMMARY OF THE INVENTION

In view of the noted deficiencies in the prior art, the invention provides a dry disconnect coupling for connecting one fluid conduit to another to form a continuous, essentially fluid-tight flow path. The dry disconnect coupling includes an adapter and a coupler which, when coupled together, define a flow passageway therethrough. The coupler includes improved connecting means for providing a rigid, fluid-tight connection between the adapter and the coupler so that the coupling does not leak during a fluid transfer operation. The coupler further includes improved sealing means for sealing the coupling as the continuous flow path is established to prevent fluid residue from accumulating on the faces of the poppet valves so that the loss at disconnect is minimized. Thus, the ground in the vicinity of the coupling is not contaminated by the fluid, for example a caustic chemical solution, transferred through the continuous flow path.

The adapter includes a hollow, generally cylindrical adapter body defining a longitudinal axis, adapter valve means centrally disposed within the adapter body and releasing means for releasing the connecting means of the coupler to disconnect the adapter and the coupler. An annular flange for attaching the adapter to the coupler is integrally formed with the adapter body or is mounted on the body as described in U.S. Pat. No. 5,407,175 assigned to the assignee of the present invention, the disclosure of which is expressly incorporated herein. The adapter valve means is preferably a conventional poppet valve which may be opened, as described hereinafter, to permit fluid to flow through the flow passageway defined by the adapter and the coupler.

The means for releasing includes a handle, handle biasing means for biasing the handle away from the coupler and a pair of sleeve-engaging cams or rollers positioned on opposite sides of the adapter body. The handle includes a pair of opposed end portions and a grasping portion located medially between the end portions. Each of the end portions of the handle is rotatably mounted on a post extending outwardly from the exterior surface of the adapter body. The handle biasing means preferably consists of a pair of torsional, or coil, springs that are positioned around the posts between the end portions of the handle and the adapter body. Each of the sleeve-engaging rollers is rotatably mounted to the handle between the grasping portion of the handle and a respective end portion of the handle.

The coupler includes a hollow, generally cylindrical coupler body defining a longitudinal axis, coupler valve means centrally disposed within the body and the improved connecting means for providing a rigid, fluid-tight connection between the adapter and the coupler. The connecting means includes a generally cylindrical connecting sleeve, sleeve biasing means, a plurality of latching lugs, lug biasing means for biasing the latching lugs outwardly and sleeve override means. The coupler further includes an annular nosepiece, nosepiece override means, the improved sealing means for sealing the coupling and a cam assembly for cooperating with the sleeve override means of the connecting means, the nosepiece override means and the coupler valve means. The sealing means includes first sealing means for providing a continuous seal between the nosepiece and the coupler body, and second sealing means for initially sealing the nosepiece and the coupler valve means and subsequently sealing the nosepiece and the adapter body as the continuous flow path is established.

The coupler valve means is preferably a conventional poppet valve including a valve link for cooperating with the cam assembly, as described hereinafter. The connecting sleeve of the connecting means is disposed radially outwardly of the coupler body and concentrically about the longitudinal axis. The sleeve biasing means biases the connecting sleeve and the sleeve override means in the direction of the adapter. The sleeve override means cooperates with the cam assembly, as described hereinafter, to bias the connecting sleeve in the direction of the adapter once the latching lugs engage the flange of the adapter body. Accordingly, the latching lugs are held securely against the flange of the adapter body to form the rigid, fluid-tight connection between the adapter and the coupler. Thereafter, the sleeve override means permits the cam assembly to open the poppet valve of the coupler while the rigid connection formed by the connecting means is maintained.

The nosepiece is disposed radially inwardly of the coupler body and concentrically about the longitudinal axis. The nosepiece override means cooperates with the cam assembly, as described hereinafter, to bias the nosepiece in the direction of the adapter as the continuous flow path is established. The first sealing means continuously maintains a fluid-tight seal between the nosepiece and the coupler body. The second sealing means forms a temporary fluid-tight seal between the nosepiece and the periphery of the poppet valve of the coupler until the face of the poppet valve of the coupler comes into contact with the face of the poppet valve of the adapter. Thereafter, the second sealing means forms a temporary fluid-tight seal between the nosepiece and the adapter body until the face of the poppet valve of the coupler subsequently separates from the face of the poppet valve of the adapter.

The cam assembly includes a cam shaft disposed diametrically through the coupler body, a lever attached to one end of the cam shaft, a pair of sleeve cams attached to the ends of the cam shaft, a pair of nosepiece cams attached to the cam shaft at spaced apart positions between the ends of the cam shaft and a valve cam attached to the cam shaft and positioned medially between the pair of nosepiece cams. The sleeve cams engage and displace the sleeve override means of the connecting means in the direction of the adapter, as described hereinafter, so that the connecting sleeve holds the latching lugs securely against the flange of the adapter body. The nosepiece cams engage and displace the nosepiece override means in the direction of the adapter, as described hereinafter, so that the nosepiece and the nosepiece override means move together with the coupler valve means until the face of the poppet valve of the coupler comes into contact with the face of the poppet valve of the adapter. The valve cam engages the valve link of the coupler valve means, as described hereinafter, to displace the poppet valve of the coupler in the direction of the adapter to open the poppet valves of the adapter and the coupler and thereby establish the continuous flow path.

The adapter and the coupler are first aligned and then brought together until the lug biasing means are overcome and the latching lugs of the connecting means of the coupler engage the flange of the adapter body. The connecting sleeve and the sleeve override means, which are biased in the direction of the adapter by the sleeve biasing means, are thereby freed to move in the direction of the adapter from a first, or retracted, position to a second, or extended position over the latching lugs. The lever of the cam assembly is then rotated from a first, or closed, position towards a second, or open, position. As the lever is rotated through about its first ten degrees of travel, the sleeve cams of the cam assembly engage and displace the sleeve override means in the direction of the adapter. Thereafter, the connecting sleeve is further biased by the sleeve override means such that the latching lugs are held securely against the flange of the adapter. Thus, the rigid, fluid-tight connection between the adapter and the coupler is maintained even if a side load is applied to the coupling or the mechanical components of the coupling are worn.

As the lever of the cam assembly is rotated further towards the open position, the nosepiece cams engage and displace the nosepiece override means. Simultaneously, the valve cam engages the valve link of the coupler valve means so that the poppet valve of the coupler is displaced in the direction of the adapter. As the nosepiece, nosepiece override means and poppet valve of the coupler move together in the direction of the adapter, the first sealing means continuously maintains a fluid-tight seal between the nosepiece and the coupler body. Meanwhile, the second sealing means forms a temporary fluid-tight seal between the nosepiece and the periphery of the poppet valve of the coupler. Eventually, the face of the poppet valve of the coupler comes into contact with the face of the poppet valve of the adapter and the nosepiece comes into contact with the adapter body. As the lever is rotated further, the nosepiece override means biases the nosepiece in the direction of the adapter and the second sealing means forms a temporary fluid-tight seal between the nosepiece and the adapter body. Meanwhile, the valve cam continues to displace the poppet valve of the coupler in the direction of the adapter until the lever reaches the full open position and the continuous flow path is established.

After a fluid transfer operation, the lever is returned from the open position to the closed position. As the lever is rotated towards the closed position, the valve cam engages the valve link of the coupler valve means to displace the poppet valve of the coupler in the direction of the coupler. When the poppet valve of the coupler once again comes into contact with the nosepiece and the face of the poppet valve of the coupler separates from the face of the poppet valve of the adapter, the second sealing means again forms the temporary fluid-tight seal between the nosepiece and the periphery of the poppet valve of the coupler. At the same time, the nosepiece cams release the nosepiece override means so that the nosepiece is no longer biased in the direction of the adapter. Thereafter, the nosepiece, the nosepiece override means and the poppet valve of the coupler move together (under the influence of the valve cam) in the direction of the coupler until the poppet valve of the coupler is completely closed. As the lever is rotated through about its final ten degrees of rotation towards the closed position, the sleeve cams release the sleeve override means so that the connecting sleeve is no longer biased in the direction of the adapter.

As the lever is rotated back to the closed position, a gap is formed between the sleeve override means and the sleeve cams. This gap permits the releasing means of the adapter to release the connecting means of the coupler to disconnect the adapter and the coupler. While facing the adapter, the coupler is held in one hand while the grasping portion of the handle of the releasing means of the adapter is grasped with the other hand. The handle is then rotated about the posts extending outwardly from the adapter body against the force of the handle biasing means in the direction of the coupler so that the sleeve-engaging rollers engage the connecting sleeve of the coupler. The sleeve-engaging rollers displace the connecting sleeve in the direction of the coupler from the extended position to the retracted position. At the same time, the lug biasing means bias the latching lugs outwardly such that the latching lugs disengage from the flange of the adapter body. The handle of the releasing means of the adapter is then permitted to return to its biased position under the influence of the handle biasing means and the adapter and the coupler are separated.

BRIEF DESCRIPTION OF THE DRAWINGS

The foregoing and other objects will become more readily apparent by referring to the following detailed description and the appended drawings in which.

DETAILED DESCRIPTION OF THE PREFERRED EMBODIMENTS

Figure 1:
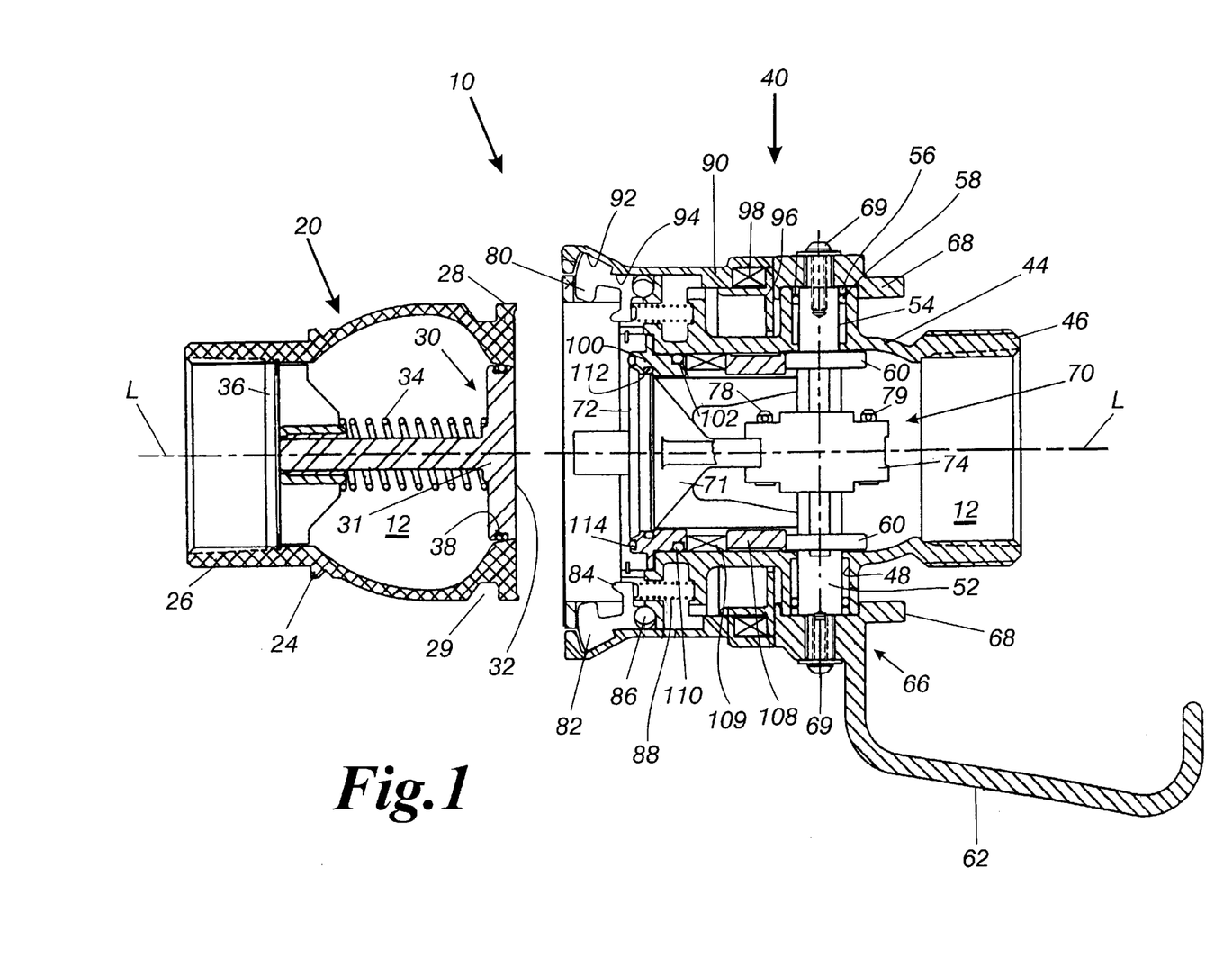
FIG. 1 is a sectional view of a dry disconnect coupling according to the invention showing the adapter and the coupler disconnected.

Referring to the accompanying drawings, FIG. 1 illustrates a dry disconnect coupling, indicated generally at 10, according to the invention. The coupling 10 connects one fluid conduit to another to form a continuous, essentially fluid-tight flow path. Preferably, the coupling 10 is a DRY-BREAK™ coupling manufactured by the assignee of the present invention, Emco Wheaton DTM, Morrisville, N.C., for connecting the transfer hose (not shown) of a storage tank and the fill pipe (not shown) of a tanker truck to transfer caustic chemicals or petroleum products between the storage tank and the tanker truck at a storage tank farm. The coupling 10 comprises an adapter 20 and a coupler 40 which, when coupled together, define a fluid passageway 12 therethrough.

During a fluid transfer operation, prior dry disconnect couplings typically leak if a side load is applied to the coupling or if the mechanical components of the coupling are worn. In addition, fluid residue may accumulate around the periphery and on the faces of the poppet valves of the adapter and the coupler. If not collected and returned to the flow path, this fluid residue may spill onto and contaminate the ground in the vicinity of the coupling when the adapter and the coupler are disconnected. The coupler 40 comprises improved connecting means for providing a rigid, fluid-tight connection between the adapter 20 and the coupler so that the coupling does not leak during a fluid transfer operation. The coupler further comprises improved sealing means for sealing the coupling as the continuous flow path is established to prevent fluid residue from accumulating on the faces of the poppet valves of the adapter and the coupler so that the loss at disconnect is minimized. Thus, the ground in the vicinity of the coupling is not contaminated by the fluid, for example a caustic chemical solution, transferred through the continuous flow path during a fluid transfer operation.

As best shown in FIG. 1, the adapter 20 comprises a hollow, generally cylindrical adapter body 24 defining a longitudinal axis L, adapter valve means 30 centrally disposed within the adapter body 24 and improved releasing means for releasing the connecting means of the coupler 40 to disconnect the adapter 20 and the coupler 40. The adapter body 24 comprises a fluid conduit-receiving end portion 26 for attaching one end of the adapter 20 to the fill pipe of the tanker truck. An annular flange for attaching the opposite end of the adapter 20 to the coupler 40 may be integrally formed with the adapter body 24. Preferably, however, a rotatable annular flange 28 is mounted on the adapter body 24 as described in U.S. Pat. No. 5,407,175 assigned to the assignee of the present invention, the disclosure of which is expressly incorporated herein. The flange 28 is rotatable to facilitate repositioning of the flange on the adapter body 24 relative to the coupler 40 to distribute wear evenly on the flange 28.

Adapter valve means 30 is preferably a conventional poppet valve 31 which may be opened, as described hereinafter, to permit fluid to flow through the flow passageway 12 defined by the adapter 20 and the coupler 40. When closed, poppet valve 31 seals the flow passageway 12. The poppet valve 31 of the adapter 20 comprises a face 32 that is biased in the direction of flange 28 by a spring 34 disposed concentrically about the stem of the poppet valve. Preferably, the spring 34 is positioned between the face 32 and a retaining ring 36 disposed radially inwardly of the adapter body 24 within the fluid passageway 12. The retaining ring 36 is secured to the inner surface of the adapter body 24 and is preferably located adjacent the fluid conduit-receiving end portion 26 of the adapter body 24. An annular valve seal 38 is positioned in a groove formed in the periphery of the face 32 of the poppet valve 31. Preferably, the valve seal 38 is a conventional O-ring that forms a seal between the periphery of the face 32 of the poppet valve 31 and the inner surface of the adapter body 24 when the poppet valve 31 is in its closed position. The poppet valve 31 of the adapter 20 may also be provided with an auxiliary lever (not shown) for opening the adapter valve means 30 against the spring 34 to permit fluid to flow from the tanker truck through the adapter, for example, when emptying the fluid from the tanker truck.

Figure 1A:
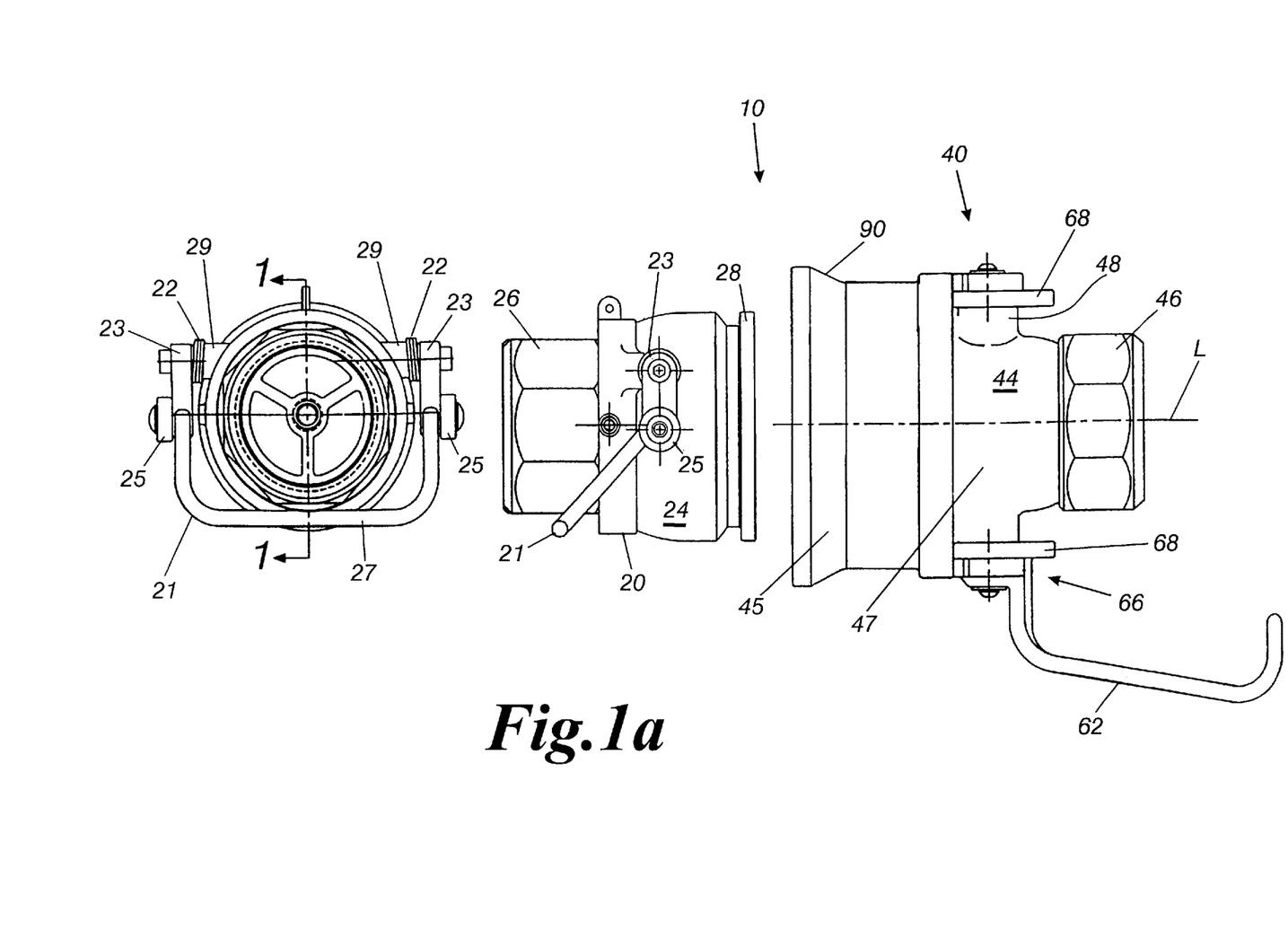
FIG. 1a is a side view of the dry disconnect coupling of FIG. 1 together with an end view of the adapter of the coupling.

As best shown in FIG. 1a, the releasing means comprises a handle 21, handle biasing means 22 for biasing the handle away from the coupler 40 and a pair of sleeve-engaging cams or rollers 25 attached to the handle 21 on opposite sides of the adapter body 24. The handle 21 comprises a pair of opposed end portions 23 and a grasping portion 27 located medially between the end portions 23 of the handle 21. Each of the end portions 23 is pivotally mounted on a post 29 extending outwardly from the exterior surface of the adapter body 24. The handle biasing means 22 preferably comprises a pair of torsional, or coil, springs that are disposed concentrically about the posts 29 between the end portions 23 of the handle 21 and the adapter body 24. Each of the sleeve-engaging rollers 25 is rotatably mounted to the handle 21 between the grasping portion 27 of the handle and a respective end portion 23. The grasping portion 27 of the handle 21 permits a user to grasp the handle 21 to release the connecting means of the coupler 40. The pair of sleeve-engaging rollers 25 are positioned on the handle 21 to contact the connecting means of the coupler 40 at diametrically opposed locations on the annular forward edge of the connecting sleeve 90 to disconnect the adapter 20 and the coupler, as described hereinafter.

As best shown in FIGS. 1 and 1a, the coupler 40 comprises a hollow, generally cylindrical coupler body 44 defining a longitudinal axis L, coupler valve means 70 centrally disposed within the coupler body 44 and the improved connecting means for providing a rigid, fluid-tight connection between the adapter 20 and the coupler 40. The connecting means comprises a connecting sleeve 90, sleeve biasing means, a plurality of latching lugs 80, lug biasing means for biasing the latching lugs 80 outwardly and sleeve override means. The coupler 40 further comprises an annular nosepiece 100, nosepiece override means, the improved sealing means for sealing the coupling and a cam assembly for cooperating with the sleeve override means of the connecting means, and the nosepiece override means and the coupler valve means 70. The sealing means includes first sealing means for providing a seal between the nosepiece 100 and the coupler body 44, and second sealing means for initially providing a temporary fluid-tight seal between the nosepiece and the poppet valve means 70 as the continuous flow path is established, and subsequently providing a temporary fluid-tight seal between the nosepiece 100 and the adapter body 24.

The coupler body 44 is preferably cast from aluminum, stainless steel or other lightweight yet high strength metal or metal alloy. The coupler body 44 comprises a fluid conduit-receiving end portion 46, an adapter-receiving end portion 45 opposite the end portion 45 and a medial portion 47 located between the end portion 45 and the end portion 46. Once the end portion 46 of the coupler 40 is attached to the transfer hose of the storage tank and the end portion 26 of the adapter 20 is attached to the fill pipe of the tanker truck, the continuous flow passageway 12 is formed by connecting the end portion 45 of the coupler 40 to the flange 28 of the adapter 20 as described hereinafter. In a preferred embodiment, the medial portion 47 of the coupler body 44 has a pair of diametrically opposed ports 48 formed therein for receiving the cam assembly within the coupler body 44 so that the cam assembly cooperates with the sleeve override means of the connecting means, the nosepiece override means and the coupler valve means 70.

Coupler valve means 70 is preferably a conventional poppet valve 71 which may be opened, as described hereinafter, to permit fluid to flow through the flow passageway 12 defined by the adapter 20 and the coupler 40. When closed, poppet valve 71 seals the flow passageway 12. The poppet valve 71 of the coupler 40 comprises a face 72 having a periphery that is sealed by the second sealing means as described hereinafter. The coupler valve means 70 further comprises a valve link 74 that is pivotally secured at one end to the stem of the poppet valve 71 by a hitch pin 78. The other end of the valve link 74 is pivotally secured to a valve cam 76 (FIG. 4) of the cam assembly by a hitch pin 79. The valve link 74 of the coupler valve means 70 cooperates with the cam assembly, and in particular with the valve cam 76 of the cam assembly as described hereinafter, to displace the poppet valve 71 of the coupler 40 in the direction of the adapter 20.

Figure 2:
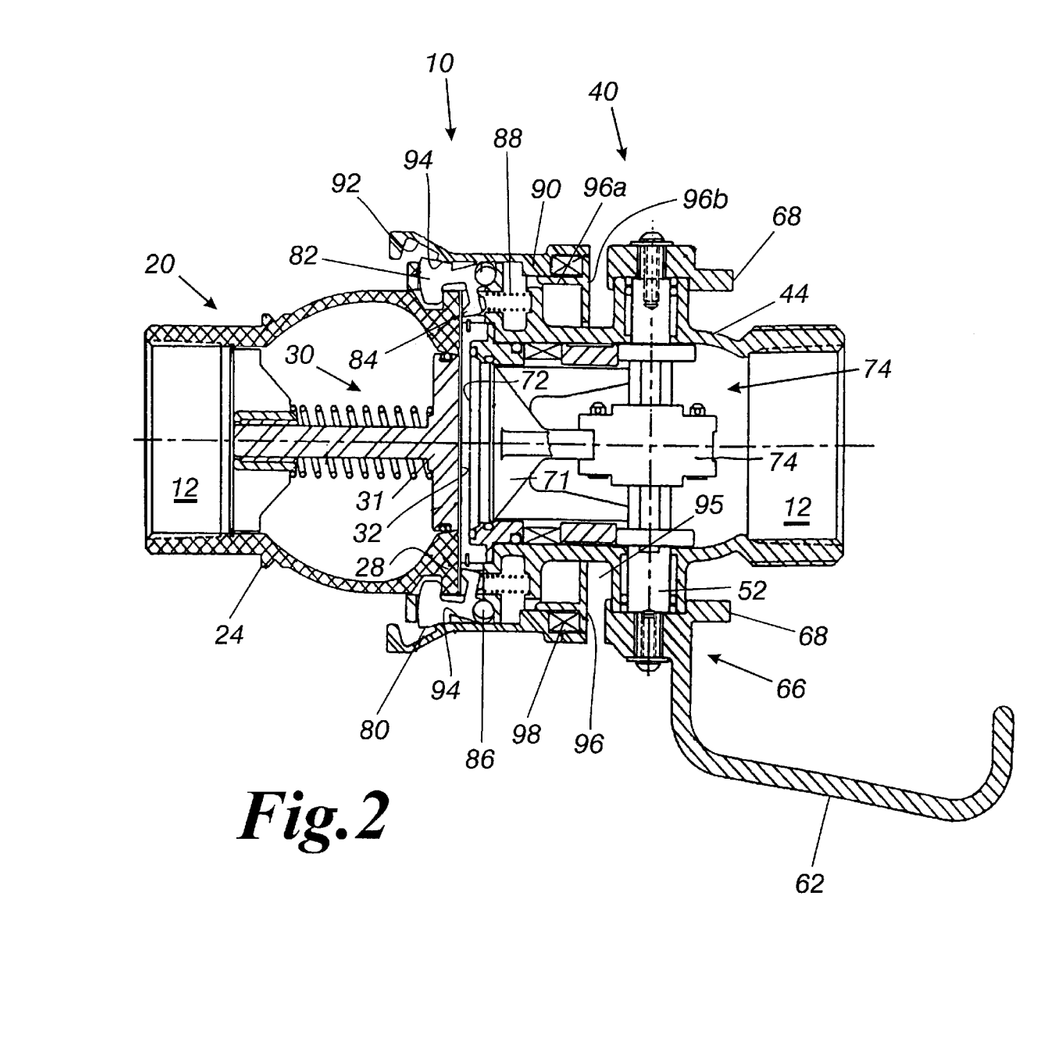
FIG. 2 is a sectional view of the dry disconnect coupling of FIG. 1 showing the adapter and the coupler connected with the lever of the coupler in the first, or closed, position.

The hollow, generally cylindrical connecting sleeve 90 of the connecting means is disposed radially outwardly of the coupler body 44 and concentrically about the longitudinal axis L defined by the coupler body 44. The sleeve 90 is movable longitudinally relative to the coupler body 44 between a first, or retracted, position when the adapter 20 and the coupler 40 are disconnected (FIG. 1) and a second, or extended, position when the adapter 20 and the coupler 40 are connected (FIG. 2). In the retracted position, the plurality of outwardly biased latching lugs 80 are retained within a lug-receiving groove 92 formed in the inner surface of the connecting sleeve. In the extended position, a ramp 94 defined by the inner surface of the connecting sleeve 90 adjacent the lug-receiving groove 92 overlies the plurality of latching lugs 80 in frictional relation therewith to hold the latching lugs 80 securely against the flange 28 of the adapter body 24. Also in the extended position, a gap 95 (FIG. 2) is formed for a purpose to be described hereinafter.

The sleeve biasing means biases the connecting sleeve 90 and the sleeve override means in the direction of the adapter 20. Preferably, the sleeve biasing means comprises a pair of springs (not shown) positioned over guide rods (not shown) which are mounted within the medial portion 47 as the coupler body 44 opposite the connecting sleeve 90 and the sleeve override means. The springs and guide rods are preferably positioned on diametrically opposite sides of the coupler body 44 so that the sleeve biasing means engages the override means evenly and exerts an equal extension force in the direction of the adapter 20 on opposite sides of the coupler body 44. Thus, the connecting sleeve 90 and the sleeve override means are displaced along the longitudinal axis L of the coupler 40 in the direction of the adapter 20.

The plurality of latching lugs 80 are equally spaced about the circumference of the coupler body 44 adjacent the adapter-engaging end portion 45 of the coupler body 44. The number of latching lugs 80 may range from two to eight. Preferably, however, the number of latching lugs 80 ranges from four to six, and is most preferably five. Each of the latching lugs 80 comprises a sleeve-engaging portion 82, an adapter-engaging portion 84 and a lug pivot 86. The lug biasing means comprises a spring 88 positioned over a guide rod (not shown) adjacent the adapter-engaging portion 84 of each latching lug 80. The spring 88 biases the adapter-engaging portion 84 of the latching lug 80 outwardly about the lug pivot 86 so that the sleeve-engaging portion 82 of each latching lug 80 is received within the lug-receiving groove 92 in the retracted position. Accordingly, the connecting sleeve 90 cannot be extended unless all of the latching lugs 80 pivot inwardly about lug pivots 86 against the biasing force of springs 88.

As best shown in FIG. 2, when the adapter-engaging portions 84 of the latching lugs 80 engage the adapter body 24 adjacent the flange 28, the latching lugs pivot about the lug pivot 86 thereby permitting the sleeve biasing means to displace the connecting sleeve 90 and the sleeve override means in the direction of the adapter 20 from the retracted position to the extended position. Accordingly, the ramp portion 94 of the connecting sleeve 90 overlies the outer surface of the sleeve-engaging portions 82 of the latching lugs 80 to hold the latching lugs 80 within the lug-receiving recess 29 formed in the periphery of the adapter body 24 adjacent the flange 28. With the plurality of latching lugs 80 engaging the flange 28 of the adapter body 24, the sleeve override means is free to cooperate with the cam assembly, as described hereinafter, to further bias the connecting sleeve 90 in the direction of the adapter 20. Accordingly, the latching lugs 80 are held securely against the flange 28 of the adapter body 24 to form the rigid, fluid-tight connection between the adapter 20 and the coupler 40 even if a side load is applied to the coupling 10 or the flange 28 of the adapter 20 is worn. Thereafter, the sleeve override means permits the cam assembly to open the poppet valve 71 while the rigid, fluid-tight connection formed by the connecting means is maintained.

The sleeve override means is disposed concentrically about the longitudinal axis L of the coupler 40 between the coupler body 44 and the connecting sleeve 90. Preferably, the sleeve override means comprises an annular sleeve override plate 96 and an annular sleeve wave spring 98. The sleeve override plate 96 preferably has a T-shaped cross-section and comprises a longitudinal portion 96a (FIG. 2) parallel to the longitudinal axis L and a radial portion 96b (FIG. 2) perpendicular to the longitudinal axis L. The sleeve wave spring 98 is positioned between the radial portion 96b of the sleeve override plate 96 and a mechanical stop provided on the connecting sleeve 90.

Figure 3:
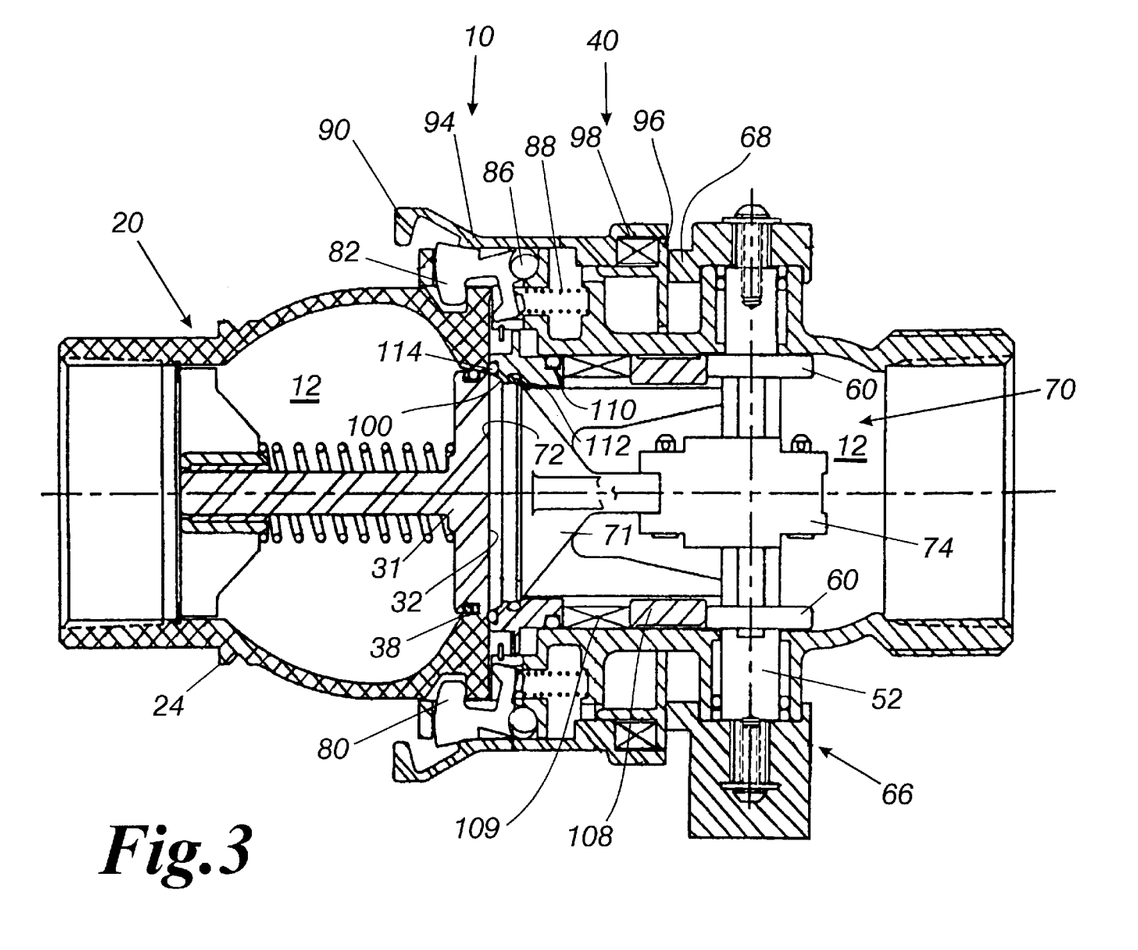
FIG. 3 is a sectional view of the dry disconnect coupling of FIG. 1 showing the adapter and the coupler connected with the face of the poppet valve of the coupler in contact with the face of the poppet valve of the adapter and the nosepiece of the coupler in contact with the adapter body.

As shown in FIG. 3, when the cam assembly cooperates with the sleeve override means, as described hereinafter, the sleeve wave spring 98 is compressed so that it exerts a pre-load force on the connecting sleeve 90 in the direction of the adapter 20. Accordingly, the sleeve override means further biases the connecting sleeve 90 in the direction of the adapter 20 with the ramp portion 94 of the connecting sleeve 90 overlying the outer surface of the sleeve-engaging portions 82 of the latching lugs 80 so that the latching lugs 80 are held securely against the flange 28 of the adapter body 24. In particular, the connecting sleeve 90 frictionally engages the latching lugs 80 in a manner similar to a conventional chuck. At a predetermined position of the cam assembly, the pre-load force on the connecting sleeve 90 exceeds the extension force of the sleeve wave spring 98. Beyond this position, the sleeve wave spring 98 compresses further to permit the cam assembly to cooperate with the nosepiece override means and the coupler valve means 70 as described hereinafter.

The nosepiece 100 is disposed concentrically about the longitudinal axis L between the periphery of the poppet valve 71 and the inner surface of the coupler body 44. The nosepiece 100 is biased in the direction of the adapter 20 by the nosepiece override means, as described hereinafter. The nosepiece 100 has a first circumferential groove 102 (FIG. 1) formed in the outer surface of the nosepiece 100, a second circumferential groove 104 (FIGS. 5a–c) formed in the inner surface of the nosepiece 100 and a third annular groove 106 (FIGS. 5a–c) formed in the leading edge 105 of the nosepiece 100 adjacent the adapter-engaging end portion 45 of the coupler body 44. The grooves 102, 104 and 106 receive a conventional O-ring therein to form the improved sealing means described hereinafter. In a preferred embodiment, each of the grooves 102, 104 and 106 define a dovetail configuration which retains the O-ring under compression such that the O-ring bulges outwardly slightly from the groove. The dovetail configuration is particularly desirable for the groove 106 for a purpose described hereinafter.

As best shown in FIG. 3, the nosepiece override means comprises an annular nosepiece wave spring seat 108 and an annular nosepiece wave spring 109 that cooperate with the cam assembly to bias the nosepiece 100 in the direction of the adapter 20. In particular, the leading edge of the nosepiece wave spring seat 108 engages the trailing edge of the nosepiece wave spring 109 and the leading edge of the nosepiece wave spring 109 engages the trailing edge of the nosepiece 100. At a predetermined position, the cam assembly engages and displaces the nosepiece override means to produce a pre-load force on the nosepiece 100 that exceeds the extension force of the nosepiece wave spring 109. Beyond this position, the nosepiece wave spring 109 compresses further to permit the cam assembly to cooperate with the coupler valve means 70 as described hereinafter.

The improved sealing means comprises first sealing means and second sealing means. The first sealing means provides a continuous seal between the nosepiece 100 and the coupler body 44. The second sealing means initially provides a seal between the nosepiece 100 and the coupler valve means 70, and subsequently provides a seal between the nosepiece 100 and the adapter body 24 as the continuous flow path is established. Preferably, the first sealing means comprises a first O-ring 110 positioned within the groove 102 formed in the outer surface of the nosepiece 100 such that the O-ring 110 forms and maintains a continuous seal between the outer surface of the nosepiece 100 and the inner surface of the coupler body 46. Preferably, the second sealing means comprises a second O-ring 112 positioned within the groove 104 and a third O-ring 114 positioned within the groove 106.

The O-ring 112 forms a temporary fluid-tight seal (FIG. 5a) between the inner surface of the nosepiece 100 and the periphery of the poppet valve 71 of the coupler 40. The O-ring 114 initially forms a temporary fluid-tight seal (FIG. 5a) between the inner surface of the nosepiece 100 and the periphery of the poppet valve 71 of the coupler 40, and subsequently forms a temporary fluid-tight seal (FIG. 5c) between the leading edge 105 of the nosepiece 100 and the flange 28 of the adapter body 24. Intermediately, and in particular when the face 72 of the poppet valve 71 of the coupler 40 contacts the face 32 of the poppet valve 31 of the adapter 20 (FIG. 5b), the O-ring 114 simultaneously forms a temporary fluid-tight seal between the outer surface of the nosepiece 100 and the periphery of the poppet valve 71 and between the leading edge of the nosepiece 100 and the flange 28 of the adapter body 24.

The cam assembly includes a cam shaft 52 disposed diametrically through the medial portion 47 of the coupler body 46 within the ports 48 formed in the coupler body 46. The cam assembly further comprises a lever 62 attached to one end of the cam shaft 52, a pair of opposed sleeve cams 68 attached to the ends of the cam shaft 52, a pair of opposed nosepiece cams 60 positioned on the cam shaft 52 and spaced apart between the ends of the cam shaft 52 and a valve cam 76 (FIG. 4) positioned medially between the pair of nosepiece cams 60 and aligned with the longitudinal axis L of the coupler body 44. Preferably, the lever 62 is integrally formed with the sleeve cam 68 on the lever side of the coupler 40 and is separated therefrom by an intermediate attachment block 66. However, the sleeve 62 and the sleeve cam 68 on the lever side of the coupler 40 may be separate parts that are fixed to one another so that the sleeve cam 68 and the lever 62 rotate together about the cam shaft 52. The lever 62 and the sleeve cam 68 opposite the lever 62 (or the attachment block 66 and the sleeve cam 68 opposite the lever 62) are attached to the ends of the cam shaft 52 by a pair of button head screws 69.

The cam assembly further comprises a pair of opposed shaft bearings 54, a pair of opposed shaft spacers 56, and a pair of opposed shaft O-rings 58. The shaft bearings 54, the shaft spacers 56 and the shaft O-rings 58 are positioned within the ports 48 of the coupler body 44 between the sleeve cams 68 and the nosepiece cams 60 and frictionally engage the surface of the cylindrical walls of the ports 48. The shaft bearings 54 and the shaft spacers 56 permit the cam shaft 52, the sleeve cams 68, the nosepiece cams 60 and the valve cam 76 to rotate about a transverse axis T perpendicular to the longitudinal axis L. The shaft O-rings 58 prevent fluid that may enter the ports 48 of the coupler body 44 when the cam shaft 52 is rotated from leaking out of the ports 48 onto the ground in the vicinity of the coupling 10.

The sleeve cams 68 engage and displace the sleeve override means of the connecting means in the direction of the adapter 20, as described hereinafter, so that the sleeve wave spring 98 compresses and exerts a pre-load force on the connecting sleeve 90 in the direction of the adapter 20. The nosepiece cams 60 engage and displace the nosepiece override means in the direction of the adapter 20, as described hereinafter, so that the nosepiece 100 moves together with the coupler valve means 70 until the face 72 of the poppet valve 71 of the coupler 40 comes into contact with the face 32 of the poppet valve 31 of the adapter 20. The valve cam 76 engages the valve link 74 of the coupler valve means 70, as described hereinafter, to displace the poppet valve 71 of the coupler 40 in the direction of the adapter 20 to establish the continuous flow path. The continuous flow path is established when the force exerted by the face 72 of the poppet valve 71 of the coupler 40 on the face 32 of the poppet valve 31 of the adapter 20 compresses the valve spring 34 of the adapter valve means 30 sufficiently to permit fluid to flow through the flow passageway 12.

The adapter body 24, the coupler body 44, the connecting sleeve 90, the cam shaft 52, the shaft spacers 56, the nosepiece 100, the valve means of the coupler 40 and the plurality of latching lugs 80 may be made from stainless steel or other corrosion resistant, high strength metal or metal alloy. Preferably, the above components are die cast from type 316 stainless steel. The shaft bearings 54 may be made from a polytetrafluoroethylene (PTFE) material, such as Teflon®, or a fluorocarbon resin, such as is available from E.I. DuPont Nemours & Co., Inc. The O-rings 58, 110, 112 and 114, may be made of a perfluorelastomer material, such as Parafluor™. The sleeve cams 68, the nosepiece cams 60, the sleeve override plate 96, the nosepiece wave spring seat 108 and the lever 62 may be made from non-fusing metals or metal alloys, and preferably are die cast from Nitronic 60.

In operation, the adapter 20 and the coupler 40 are first aligned along the longitudinal axis L as shown in FIG. 1. The adapter 20 and the coupler 40 are then brought together along the longitudinal axis L until the springs 88 of the lug biasing means are overcome and the latching lugs 80 of the connecting means engage the flange 28 of the adapter body 24, as shown in FIG. 2. The connecting sleeve 90 and the sleeve override means, which are biased in the direction of the adapter 20 by the sleeve biasing means, are freed to move in the direction of the adapter 20 when the latching lugs 80 disengage from the annular lug-receiving groove 92 formed in the inner surface of the connecting sleeve 90. The connecting sleeve 90 and the sleeve override means move under the influence of the sleeve biasing means from a first, or retracted, position to a second, or extended, position over the outer surface of the adapter-engaging portions 82 of the latching lugs 80.

With the connecting sleeve 90 and the sleeve override means in the extended position, the gap 95 is formed. It should be noted that with the connecting sleeve 90 and the sleeve override means in the retracted position, the gap 95 is closed (FIG. 1). Thus, the lever 62 cannot be rotated about the cam shaft 52 to open the poppet valve 71 of the coupler valve means 70. It is only once the connecting sleeve 90 and the sleeve override means are in the extended position (FIG. 2) that the lever 62 can be operated. This safety feature prevents the poppet valve 71 from being opened unless the coupler 40 is connected to the adapter 20. A "dummy" flange 28 is utilized to trigger the sleeve biasing means to drain fluid in the fluid conduit attached to the coupler 40.

The lever 62 of the cam assembly is then rotated from a first, or closed, position towards a second, or open, position. As the lever 62 is rotated through about its first ten degrees of travel, the sleeve cams 68 of the cam assembly engage and displace the radial portions 96b of the sleeve override means in the direction of the adapter (FIG. 3). The pressure of the sleeve cam 68 on the radial portion 96b of the sleeve override plate 96 compresses the sleeve wave spring 98 such that the sleeve wave spring 98 exerts a pre-load force on the connecting sleeve 90. The pre-load force moves the ramp 94 on the inner surface of the connecting sleeve 90 further over the adapter-engaging portions 82 of the latching lugs 80. With the connecting sleeve 90 further biased by the sleeve override means in the manner described, the latching lugs 80 are held securely against the flange 28 of the adapter body 24. Thus, the rigid, fluid-tight connection between the adapter 20 and the coupler 40 is maintained even if a side load is applied to the coupling 10 or the mechanical components of the coupling 10 are worn.

As the lever 62 of the cam assembly is rotated further towards the open position, the pre-load force exerted by the sleeve wave spring 98 on the connecting sleeve 90 exceeds the force required to maintain the rigid, fluid-tight connection. Thereafter, the sleeve wave spring 98 is further compressed and the nosepiece cams 60 engage and displace the nosepiece wave spring seat 108 of the nosepiece override means in the direction of the adapter 20. The nosepiece wave spring seat 108 in turn displaces the nosepiece wave spring 109, which in turn displaces the nosepiece 100 along the longitudinal axis L. Simultaneously, the valve cam 76 engages the valve link 74 of the coupler valve means 70 such that the poppet valve 71 of the coupler 40 is displaced in the direction of the adapter 20 along the longitudinal axis L. As the nosepiece 100 and the poppet valve 70 of the coupler 40 move together in the direction of the adapter 20, the first sealing means continuously maintains a fluid-tight seal between the nosepiece 100 and the coupler body 44. In particular, the O-ring 110 in the groove 102 seals the outer surface of the nosepiece 100 and the coupler body 44 to prevent the fluid in the flow path from leaking during a fluid transfer operation.

Figure 5A:
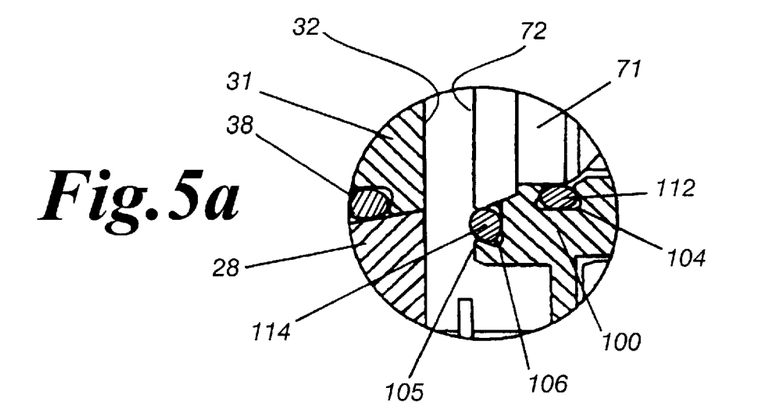
FIG. 5a is a detail view of the second sealing means of the dry disconnect coupling as seen in FIG. 2.

Meanwhile, the second sealing means forms a temporary fluid-tight seal between the nosepiece 100 and the periphery of the poppet valve 71 of the coupler 40. In particular, the O-ring 112 positioned in the groove 104 seals the inner surface of the nosepiece 100 and the periphery of the poppet valve 71 of the coupler. Likewise, the O-ring 114 positioned in the groove 106 seals the inner surface of the nosepiece 100 and the periphery of the poppet valve 71 of the coupler 70 adjacent the face 72 of the poppet valve 71. FIG. 5a is an enlarged view of the second sealing means as seen in FIG. 2. As shown in FIG. 5a, until the face 72 of the poppet valve 71 of the coupler 40 contacts the face 32 of the poppet valve 31 of the adapter 20, the O-ring 114 is enclosed within three walls; two of the walls being provided by the nosepiece 100 and one of the walls being provided by the periphery of the poppet valve 71 of the coupler 40. The wall provided by the periphery of the poppet valve 71 forms the temporary seal between the nosepiece 100 and the periphery of the poppet valve 71 of the coupler 40.

Figure 5B:
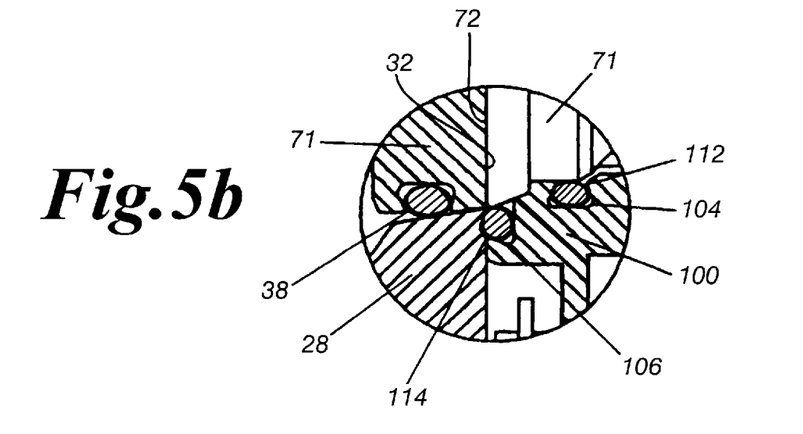
FIG. 5b is a detail view of the second sealing means of the dry disconnect coupling as seen in FIG. 3.

As best shown in FIG. 3, eventually the face 72 of the poppet valve 71 of the coupler 40 comes into contact with the face 32 of the poppet valve 31 of the adapter 20 and the nosepiece 100 comes into contact with the adapter body 24. FIG. 5b is an enlarged view of the second sealing means as seen in FIG. 3. As shown in FIG. 5b, when the face 72 of the poppet valve 71 of the coupler 40 contacts the face 32 of the poppet valve 31 of the adapter 20 and the nosepiece 100 contacts the flange 28 of the adapter body 24, the groove 106 is closed by flange 28 abutting the leading edge 105 of the nosepiece 100. Thus, the O-ring 114 is enclosed within four walls; two of the walls being provided by the nosepiece 100, one of the walls being provided by the periphery of the poppet valve 71 of the coupler 40 and one of the walls being provided by the flange 28 of the adapter body 24. The wall provided by the flange 28 of the adapter body 24 forms the temporary seal between the nosepiece 100 and the adapter body 24 while at the same time the wall provided by the periphery of the poppet valve 71 forms the temporary seal between the nosepiece 100 and the periphery of the poppet valve 71 of the coupler 40. Thus, fluid in the flow path is prevented from accumulating on the face 72 of the poppet valve 71 of the coupler 40 and the face 32 of the poppet valve 31 of the adapter 20 as the continuous flow path is established so that the loss at disconnect is minimized.

Figure 4:
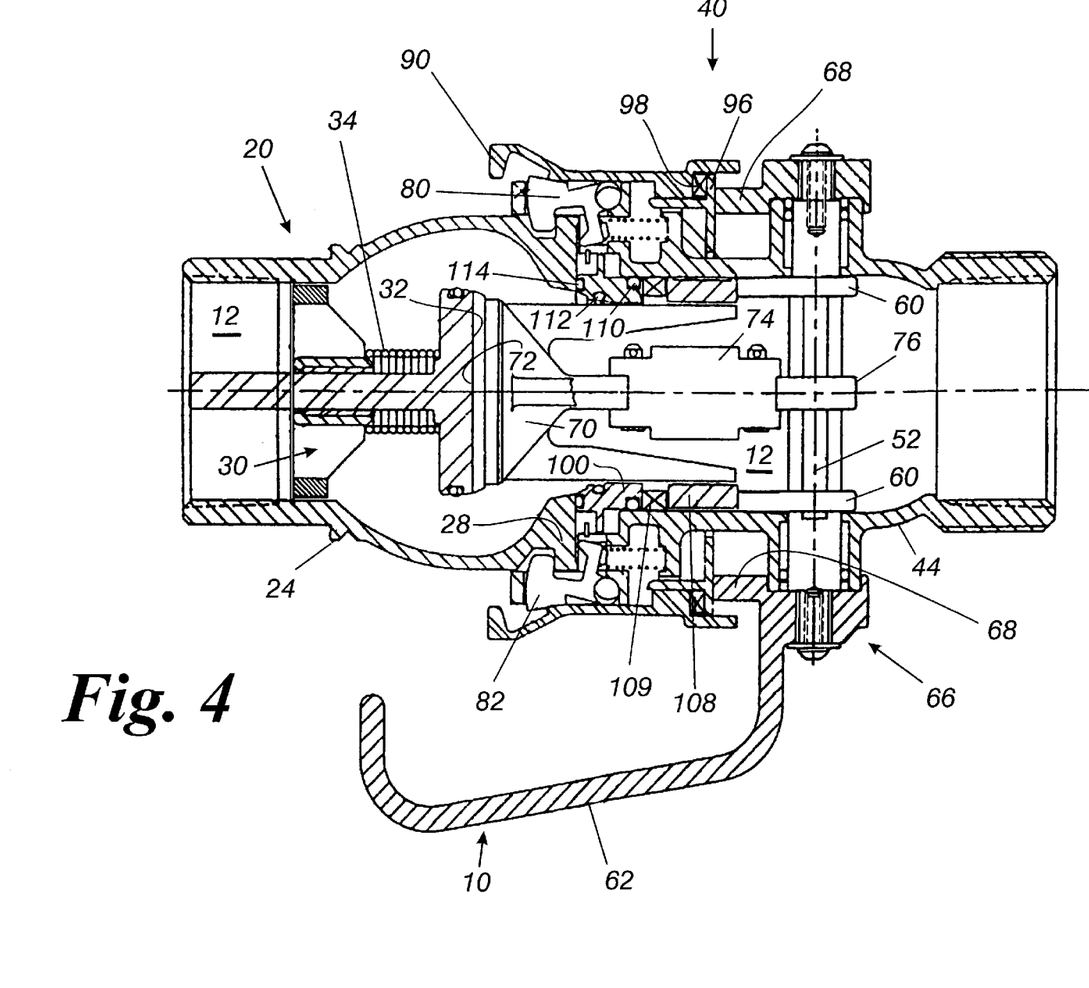
FIG. 4 is a sectional view of the dry disconnect coupling of FIG. 1 showing the adapter and the coupler connected with the lever of the coupler in the second, or open, position.
Figure 5C:
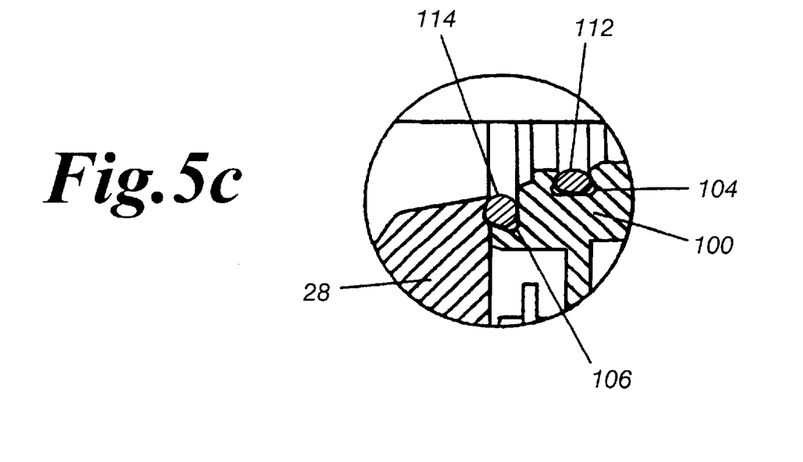
FIG. 5c is a detail view of the second sealing means of the dry disconnect coupling as seen in FIG. 4.

As the lever 62 is rotated further, the nosepiece wave spring 109 of the nosepiece override means biases the nosepiece 100 in the direction of the adapter 20 so that the second sealing means maintains the temporary seal between the nosepiece 100 and the adapter body 24. The pre-load force exerted on the nosepiece 100 by the compressed nosepiece wave spring 108 holds the nosepiece 100 securely against the flange 28 of the adapter body 24. Accordingly, the second sealing means prevents the coupling 10 from leaking between the leading edge 105 of the nosepiece and the flange 28 of the adapter body 24 during a fluid transfer operation. Meanwhile, the valve cam 76 continues to displace the poppet valve 71 of the coupler 40 in the direction of the adapter 20 until the lever 62 reaches the full open position and the continuous flow path is established. FIG. 5c is an enlarged view of the nosepiece second sealing means as seen in FIG. 4. As shown in FIG. 5c, when the poppet valve 31 of the adapter 20 and the poppet valve 71 of the coupler 40 are opened together to allow fluid to flow through the flow passageway 12, the O-ring 114 is enclosed within three walls; two of the walls being provided by the nosepiece 100 and one of the walls being provided by the flange 28 of the adapter body 24. Thus, while fluid in the flow path flows through the flow passageway 12, the wall provided by the flange 28 of the adapter body 24 forms the temporary seal between the nosepiece 100 and the adapter body 24 to prevent fluid in the flow path from leaking during a fluid transfer operation.

After a fluid transfer operation, the lever 62 is returned from the open position to the closed position. As the lever 62 is rotated towards the closed position, the valve cam 76 of the cam assembly engages the valve link 74 of the coupler valve means 70 to displace the poppet valve 71 of the coupler 40 in the direction of the coupler 40. When the poppet valve 71 of the coupler 40 once again comes into contact with the nosepiece 100 and the face 72 of the poppet valve 71 of the coupler separates from the face 32 of the poppet valve 31 of the adapter 20, the second sealing means again forms the temporary fluid-tight seal between the nosepiece 100 and the periphery of the poppet valve 71 of the coupler 40. At the same time, the nosepiece cams 60 release the nosepiece override means so that the nosepiece 100 is no longer biased in the direction of the adapter 20. Thereafter, the nosepiece 100, the nosepiece override means and the poppet valve 71 of the coupler 40 move together (under the influence of the valve cam 76) in the direction of the coupler 40 until the poppet valve 71 of the coupler 40 is completely closed.

As the lever 62 is rotated through about its final ten degrees of rotation towards the closed position, the sleeve cams 68 release the radial portions 96b of the sleeve override plate 96 of the sleeve override means so that the connecting sleeve 90 is no longer biased in the direction of the adapter 20. With the lever 62 rotated back to the closed position, the gap 95 is formed between the sleeve override plate 96 and the sleeve cams 68. The gap 95 permits the releasing means of the adapter 20 to release the connecting means of the coupler 40 to disconnect the adapter 20 and the coupler 40.

While facing the adapter 20, the coupler 40 is held in one hand while the grasping portion 27 (FIG. 1a) of the handle 21 of the releasing means of the adapter 20 is grasped with the other hand. The handle 21 is then rotated about the posts 29 extending outwardly from the adapter body 24 against the force of the handle biasing means in the direction of the coupler 40 so that the sleeve-engaging rollers 25 engage the connecting sleeve 90 of the coupler 40. The sleeve-engaging rollers 25 displace the connecting sleeve 90 in the direction of the coupler 40 from the extended position to the retracted position. At the same time, the lug biasing means bias the latching lugs 80 outwardly such that the latching lugs 80 disengage from the flange 28 of the adapter body 24. The handle 21 of the releasing means of the adapter 20 is then permitted to return to its biased position under the influence of the handle biasing means and the adapter 20 and the coupler 40 are separated.

From the foregoing, it is readily apparent that the present invention provides a fluid coupling for connecting one fluid conduit to another to form a continuous, essentially fluid-tight flow path. In particular, the dry disconnect coupling includes an adapter, a coupler, improved connecting means for providing a rigid connection between the adapter and the coupler, improved sealing means for sealing the coupling and improved means for releasing the connecting means to disconnect the adapter and the coupler. The improved connecting means prevents fluid from leaking from the coupling during a fluid transfer operation even if a side load is applied to the coupling or if the mechanical components for connecting the adapter and the coupler are worn. Further, the improved sealing means prevents fluid from accumulating around the periphery and on the faces of the adapter and the coupler as the flow path is established. Accordingly, the amount of fluid residue that may be spilled and contaminate the ground in the vicinity of the coupling is minimized. The improved releasing means permits the adapter and the coupler to be easily and readily disconnected after a fluid transfer operation.

It is to be understood that the foregoing description and specific embodiments are merely illustrative of the best mode of the invention and the principles thereof, and that various modifications and additions may be made to the apparatus by those skilled in the art, without departing from the spirit and scope of the invention, which is intended to be limited only by the scope of the appended claims.

What is claimed is:

1. A coupling for connecting a first fluid conduit to a second fluid conduit to form a continuous, fluid-tight flow path, said coupling comprising:

an adapter comprising
  a hollow, generally cylindrical adapter body defining a longitudinal axis and having opposed ends, one of said opposed ends of said adapter body attached to the first fluid conduit, said adapter body comprising a flange adjacent the other of said opposed ends of said adapter body; and
  adapter valve means centrally disposed within said adapter body for controlling the flow of fluid through said adapter body, said adapter valve means comprising a face adjacent said flange of said adapter body, said face of said adapter valve means generally perpendicular to the longitudinal axis defined by said adapter body; and
a coupler comprising
  a hollow, generally cylindrical coupler body defining a longitudinal axis and having opposed ends, one of the opposed ends of said coupler body attached to the second fluid conduit;
  coupler valve means centrally disposed within said coupler body for controlling the flow of fluid through said coupler body, said coupler valve means comprising a face adjacent the other opposed end of said coupler body, said face of said coupler valve means generally perpendicular to the longitudinal axis defined by said coupler body; and
  connecting means for providing a rigid, fluid-tight connection between said adapter and said coupler, said connecting means comprising
    a generally cylindrical connecting sleeve disposed radially outwardly of said coupler body and concentrically about the longitudinal axis defined by said coupler body;
    a plurality of latching lugs circumferentially spaced on said coupler body for engaging said flange of said adapter body;
    sleeve biasing means for biasing said connecting sleeve in the direction of said adapter; and
    sleeve override means for further biasing said connecting sleeve in the direction of said adapter, said sleeve override means comprising
      an annular sleeve override plate disposed radially outwardly of said coupler body and radially inwardly of said connecting sleeve; and
      an annular sleeve wave spring positioned longitudinally between said sleeve override plate and said connecting sleeve.

2. A coupling according to claim 1:
wherein each of said latching lugs comprises a sleeve-engaging portion, an adapter-engaging portion and a lug pivot; and
wherein said connecting means further comprises
  lug biasing means for biasing said adapter-engaging portion of said latching lug outwardly about said lug pivot so that said sleeve-engaging portion of said latching lug is received within a lug-receiving groove formed in the inner surface of said connecting sleeve.

3. A coupling according to claim 1:
wherein said sleeve override means biases said connecting sleeve in the direction of said adapter so that a ramp portion provided on the inner surface of said connecting sleeve overlies the outer surface of said sleeve-engaging portions of said latching lugs to hold said latching lugs securely against said flange of said adapter body.

4. A coupling according to claim 3 wherein said coupler further comprises:
  a rotatable cam assembly for cooperating with said sleeve override means of said connecting means, said cam assembly comprising
    a cam shaft disposed diametrically through said coupler body within a pair of diametrically opposed ports formed in said coupler body, said cam shaft defining a transverse axis perpendicular to the longitudinal axis defined by said coupler body;
    a lever attached to one end of said cam shaft; and
    a pair of opposed sleeve cams attached to the ends of said cam shaft; and
  wherein said sleeve cams engage and displace said override plate of said sleeve override means of said connecting means in the direction of said adapter so that said sleeve wave spring compresses and exerts a pre-load force on said connecting sleeve.

5. A coupling according to claim 1 wherein said adapter further comprises:
  releasing means for releasing said connecting means of said coupler to disconnect said adapter and said coupler, said releasing means comprising
    a handle having a pair of opposed end portions and a grasping portion located medially between the end portions of said handle, each of the end portions of said handle pivotally mounted on said adapter body;
    handle biasing means for biasing said handle in the direction of said coupler; and
    a pair of engaging rollers attached to said handle on generally diametrically opposite sides of said adapter body, each of said engaging rollers rotatably mounted to said handle between said grasping portion of said handle and a respective end portion of said handle.

6. A coupling for connecting a first fluid conduit to a second fluid conduit to form a continuous, fluid-tight flow path, said coupling comprising;
an adapter comprising
  a hollow, generally cylindrical adapter body defining a longitudinal axis and having opposed ends, one of said opposed ends of said adapter body attached to the first fluid conduit, said adapter body comprising a flange adjacent the other of said opposed ends of said adapter body; and
  adapter valve means centrally disposed within said adapter body for controlling the flow of fluid through said adapter body, said adapter valve means comprising a face adjacent said flange of said adapter body, said face of said adapter valve means generally perpendicular to the longitudinal axis defined by said adapter body; and
a coupler comprising
  a hollow, generally cylindrical coupler body defining a longitudinal axis and having opposed ends, one ot the opposed ends of said coupler body attached to the second fluid conduit;
  coupler valve means centrally disposed within said coupler body for controlling the flow of fluid through said coupler body, said coupler valve means comprising a face adjacent the other opposed end of said coupler body, said face of said coupler valve means generally perpendicular to the longitudinal axis defined by said coupler body;
  connecting means for providing a rigid, fluid-tight connection between said adapter and said coupler;
  an annular nosepiece disposed concentrically about the longitudinal axis defined by said coupler body between the inner surface of said coupler body and said coupler valve means; and nosepiece override means disposed concentrically about the longitudinal axis defined by said coupler body between the inner surface of said coupler body and said coupler valve means, said nosepiece override means biasing said nosepiece in the direction of said adapter and comprising
    an annular nosepiece wave spring seat disposed radially outwardly of said coupler body and radially inwardly of said coupler valve means; and
    an annular nosepiece wave spring positioned longitudinally between said nosepiece wave spring seat and said nosepiece.

7. A coupling according to claim 6 wherein said coupler further comprises:
a rotatable cam assembly for cooperating with said nosepiece override means and said coupler valve means, said cam assembly comprising
    a cam shaft disposed diametrically through said coupler body within a pair of diametrically opposed ports formed in said coupler body, said cam shaft defining a transverse axis perpendicular to the longitudinal axis defined by said coupler body;
    a lever attached to one end of said cam shaft;
    a pair of opposed nosepiece cams positioned on said cam shaft and spaced apart between the ends of said cam shaft; and
    a valve cam positioned medially between said pair of nosepiece cams and aligned with the longitudinal axis defined by said coupler body; and
wherein said nosepiece cams engage and displace said nosepiece wave spring seat of said nosepiece override means in the direction of said adapter so that said nosepiece and said nosepiece wave spring move together with said coupler valve means until said face of said coupler valve means comes into contact with said face of said adapter valve means; and
wherein said valve cam engages said coupler valve means to displace said face of said coupler valve means in the direction of said adapter to establish the continuous flow path.

8. A coupling according to claim 6 further comprising:
sealing means for sealing said coupling as the continuous flow path is established to prevent fluid residue from accumulating on said face of said adapter valve means and said face of said coupler valve means, said sealing means comprising
    first sealing means for providing a continuous seal between said nosepiece and said coupler body; and
    second sealing means for initially providing a seal between said nosepiece and said coupler valve means and subsequently providing a seal between said nosepiece and said adapter body.

9. A coupling according to claim 8:
wherein said nosepiece has a first circumferential groove formed in the outer surface of said nosepiece, a second circumferential groove formed in the inner surface of said nosepiece and a third annular groove formed in the leading edge of said nosepiece adjacent the other opposed end of said coupler body; and
wherein said first groove of said nosepiece receives a conventional O-ring therein to form said first sealing means; and
wherein said second groove receives a conventional O-ring therein and said third groove receives a conventional O-ring therein to form said second sealing means.

10. A coupling according to claim 9:
wherein each of said first groove, said second groove and said third groove define a dovetail configuration which retains the O-ring therein under compression such that the O-rings bulge outwardly slightly from said first groove, said second groove and said third groove.

11. A coupling according to claim 10:
wherein the O-ring within said third groove is initially enclosed within two walls provided by said nosepiece and one wall provided by the periphery of said coupler valve means; and
wherein the O-ring within said third groove is subsequently enclosed within two walls provided by said nosepiece and one wall provided by said flange of said adapter body.

12. A coupler according to claim 6:
wherein each of said latching lugs comprises a sleeve-engaging portion and a lug pivot; and
wherein said connecting means further comprises
    lug biasing means for biasing said sleeve-engaging portion of said latching lug outwardly about said lug pivot so that said sleeve-engaging portion of said latching lug is received within a lug-receiving groove formed in the inner surface of said connecting sleeve.

13. A coupler for a fluid conduit comprising:
a hollow, generally cylindrical coupler body defining a longitudinal axis and having opposed ends, one of the opposed ends of said coupler body attached to the fluid conduit;
coupler valve means centrally disposed within said coupler body for controlling the flow of fluid through said coupler body, said coupler valve means comprising a face adjacent the other opposed end of said coupler body, said face of said coupler valve means generally perpendicular to the longitudinal axis defined by said coupler body; and
connecting means for providing a rigid, fluid-tight connection between said coupler and an external connecting member to form a continuous flow path, said connecting means comprising
    a generally cylindrical connecting sleeve disposed radially outwardly of said coupler body and concentrically about the longitudinal axis defined by said coupler body;
    a plurality of latching lugs circumferentially spaced on said coupler body;
    sleeve biasing means for biasing said connecting sleeve in the direction of the other opposed end of said coupler body; and
    sleeve override means for further biasing said connecting sleeve in the direction of the other opposed end of said coupler body, said sleeve override means comprising
        an annular sleeve override plate disposed radially outwardly of said coupler body and radially inwardly of said connecting sleeve; and
        an annular sleeve wave spring positioned longitudinally between said sleeve override plate and said connecting sleeve.

14. A coupler according to claim 13:
wherein said sleeve override means biases said connecting sleeve in the direction of the other opposed end of said coupler body so that a ramp portion provided on the inner surface of said connecting sleeve overlies the outer surface of said sleeve-engaging portions of said latching lugs to hold said latching lugs inwardly against said lug biasing means.

15. A coupler according to claim 14 further comprising:

a rotatable cam assembly for cooperating with said sleeve override means of said connecting means, said cam assembly comprising
   a cam shaft disposed diametrically through said coupler body within a pair of diametrically opposed ports formed in said coupler body, said cam shaft defining a transverse axis perpendicular to the longitudinal axis defined by said coupler body;
   a lever attached to one end of said cam shaft; and
   a pair of opposed sleeve cams attached to the ends of said cam shaft; and wherein said sleeve cams engage and displace said override plate of said sleeve override means of said connecting means in the direction of the other opposed end of said coupler body so that said sleeve wave spring compresses and exerts a pre-load force on said connecting sleeve.

16. A coupler according to claim 13 further comprising:

sealing means for sealing said coupler as the continuous flow path is established to prevent fluid residue from accumulating on said face of said coupler valve means, said sealing means comprising first sealing means for providing a continuous seal between said nosepiece and said coupler body; and second sealing means for initially providing a seal between said nosepiece and said coupler valve means and subsequently providing a seal between said nosepiece and the connecting member.

17. A coupler according to claim 16:

wherein said nosepiece has a first circumferential groove formed in the outer surface of said nosepiece, a second circumferential groove formed in the inner surface of said nosepiece and a third annular groove formed in the leading edge of said nosepiece adjacent the other opposed end of said coupler body; and wherein said first groove of said nosepiece receives a conventional O-ring therein to form said first sealing means; and wherein said second groove receives a conventional O-ring therein and said third groove receives a conventional O-ring therein to form said second sealing means.

18. A coupler according to claim 17 wherein each of said first groove, said second groove and said third groove define a dovetail configuration which retains the O-ring therein under compression such that the O-rings bulge outwardly slightly from said first groove, said second groove and said third groove.

19. A coupler according to claim 18:

wherein the O-ring within said third groove is initially enclosed within two walls provided by said nosepiece and one wall provided by the periphery of said coupler valve means; and wherein the O-ring within said third groove is subsequently enclosed within two walls provided by said nosepiece and one wall provided by the connecting member.

20. A coupler for a fluid conduit comprising:

a hollow, generally cylindrical coupler body defining a longitudinal axis and having opposed ends, one of the opposed ends of said coupler body attached to the fluid conduit;

coupler valve means centrally disposed within said coupler body for controlling the flow of fluid through said coupler body, said coupler valve means comprising a face adjacent the other opposed end of said coupler body, said face of said coupler valve means generally perpendicular to the longitudinal axis defined by said coupler body;

connecting means for providing a rigid, fluid-tight connection between said coupler and an external connecting member to form a continuous flow path;

an annular nosepiece disposed concentrically about the longitudinal axis defined by said coupler body between the inner surface of said coupler body and said coupler valve means; and nosepiece override means disposed concentrically about the longitudinal axis defined by said coupler body between the inner surface of said coupler body and said coupler valve means, said nosepiece override means biasing said nosepiece in the direction of the other opposed end of said coupler body and comprising
   an annular nosepiece wave spring seat disposed radially outwardly of said coupler body and radially inwardly of said coupler valve means; and
   an annular nosepiece wave spring positioned longitudinally between said nosepiece wave spring seat and said nosepiece.

21. A coupler according to claim 20 further comprising:

a rotatable cam assembly for cooperating with said nosepiece override means and said coupler valve means, said cam assembly comprising
   a cam shaft disposed diametrically through said coupler body within a pair of diametrically opposed ports formed in said coupler body, said cam shaft defining a transverse axis perpendicular to the longitudinal axis defined by said coupler body;
   a lever attached to one end of said cam shaft;
   a pair of opposed nosepiece cams positioned on said cam shaft and spaced apart between the ends of said cam shaft; and
   a valve cam positioned medially between said pair of nosepiece cams and aligned with the longitudinal axis defined by said coupler body; and wherein said nosepiece cams engage and displace said nosepiece wave spring seat of said nosepiece override means in the direction of the other opposed end of said coupler body so that said nosepiece and said nosepiece wave spring move together with said coupler valve means; and wherein said valve cam engages said coupler valve means to displace said face of said coupler valve means in the direction of the other opposed end of said coupler body to establish the continuous flow path.

* * * * *

UNITED STATES PATENT AND TRADEMARK OFFICE
CERTIFICATE OF CORRECTION

PATENT NO. : 6,009,901
DATED : January 4, 2000
INVENTOR(S) : Roberts

It is certified that error appears in the above-indentified patent and that said Letters Patent is hereby corrected as shown below:

Column 18, line 53 "ot" should be "of".

Column 20, line 16 "6" should be "13".

Signed and Sealed this

Fifth Day of September, 2000

Attest:

Q. TODD DICKINSON

Attesting Officer

Director of Patents and Trademarks